(12) United States Patent
Green

(10) Patent No.: US 12,146,601 B2
(45) Date of Patent: Nov. 19, 2024

(54) UNDERGROUND PIPE REPAIR AND PROTECTION SYSTEM

(71) Applicant: Thomas A. Green, Chattanooga, TN (US)

(72) Inventor: Thomas A. Green, Chattanooga, TN (US)

( * ) Notice: Subject to any disclaimer, the term of this patent is extended or adjusted under 35 U.S.C. 154(b) by 193 days.

(21) Appl. No.: 17/883,680

(22) Filed: Aug. 9, 2022

(65) Prior Publication Data

US 2023/0046762 A1  Feb. 16, 2023

Related U.S. Application Data

(60) Provisional application No. 63/231,486, filed on Aug. 10, 2021.

(51) Int. Cl.
*F16L 55/18* (2006.01)
*F16L 57/00* (2006.01)

(52) U.S. Cl.
CPC ............ *F16L 57/00* (2013.01); *F16L 55/18* (2013.01)

(58) Field of Classification Search
CPC ............ F16L 55/17; F16L 55/18; F16L 57/00
See application file for complete search history.

(56) References Cited

U.S. PATENT DOCUMENTS

| | | | | |
|---|---|---|---|---|
| 997,434 A * | 7/1911 | Barnes | ............ | E02D 29/12 251/153 |
| 1,213,478 A * | 1/1917 | Haase | ............ | H02G 3/14 174/37 |
| 3,929,288 A * | 12/1975 | Brusadin | ............ | B05B 15/622 239/288.5 |
| 4,049,480 A * | 9/1977 | Kutschke | ............ | B29C 44/1242 156/94 |
| 5,915,420 A * | 6/1999 | Dwight, Jr. | ............ | F16L 55/16 138/97 |
| 5,983,925 A * | 11/1999 | Miller | ............ | F16K 27/006 137/364 |
| 6,035,887 A * | 3/2000 | Cato | ............ | E03B 7/08 137/364 |
| 7,004,677 B1 * | 2/2006 | Ericksen | ............ | A01G 25/162 137/364 |
| 8,776,822 B2 * | 7/2014 | McIntire | ............ | E03B 7/07 137/493.9 |
| 10,612,682 B1 * | 4/2020 | Moore | ............ | E03B 9/08 |
| 2007/0063067 A1 * | 3/2007 | Keeney | ............ | G01F 15/18 239/200 |
| 2007/0272305 A1 * | 11/2007 | Schumacher | ............ | F16K 27/12 137/382 |
| 2010/0012215 A1 * | 1/2010 | Morton | ............ | F16L 55/172 138/99 |

* cited by examiner

*Primary Examiner* — Benjamin F Fiorello
(74) *Attorney, Agent, or Firm* — Miller & Martin PLLC

(57) ABSTRACT

A method and apparatus provides an enclosed pipe repair where two pipe segments extend through first and second ends of the enclosure to a volume in the enclosure housing the repair. The enclosure surrounds the repair to hopefully prevent roots from accessing the repair in many cases, and if a second problem exists, to provide access to the site of the repair through a lid in the enclosure.

13 Claims, 2 Drawing Sheets

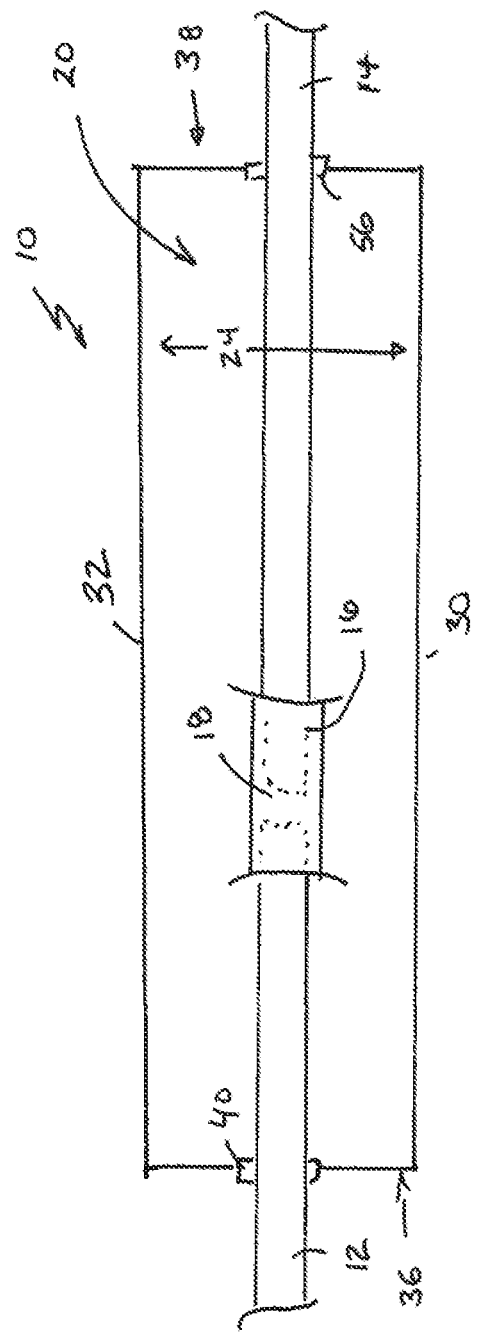
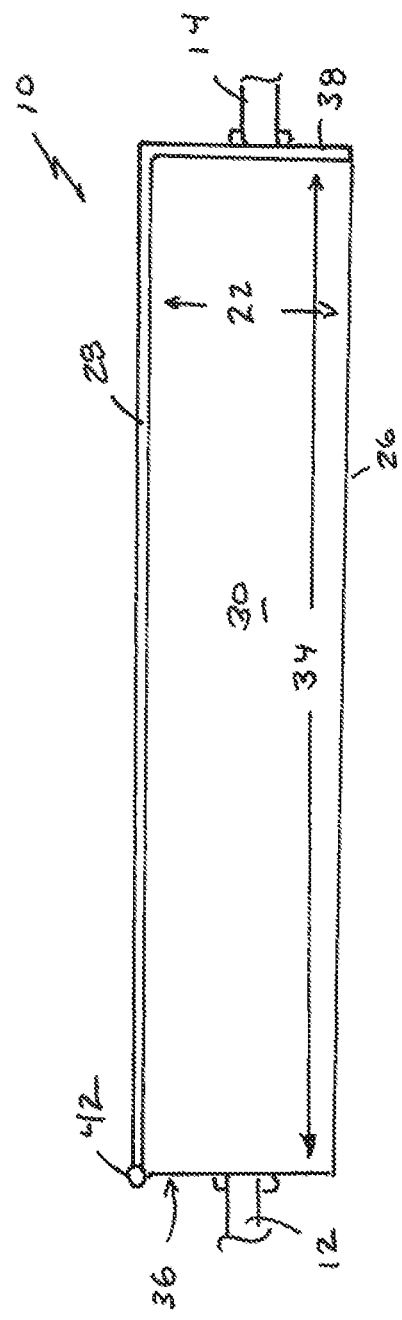

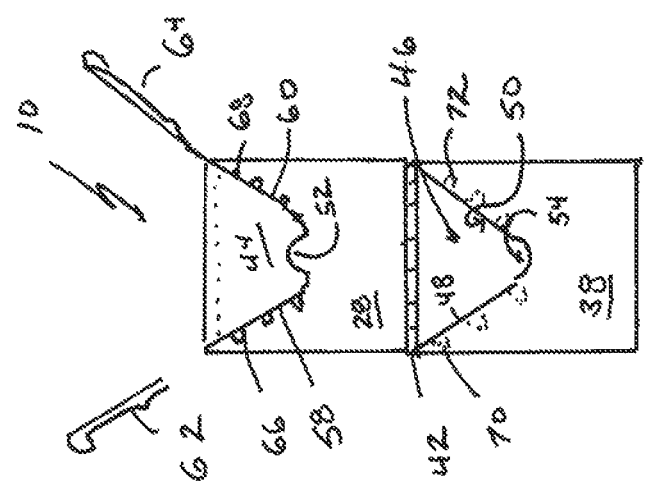
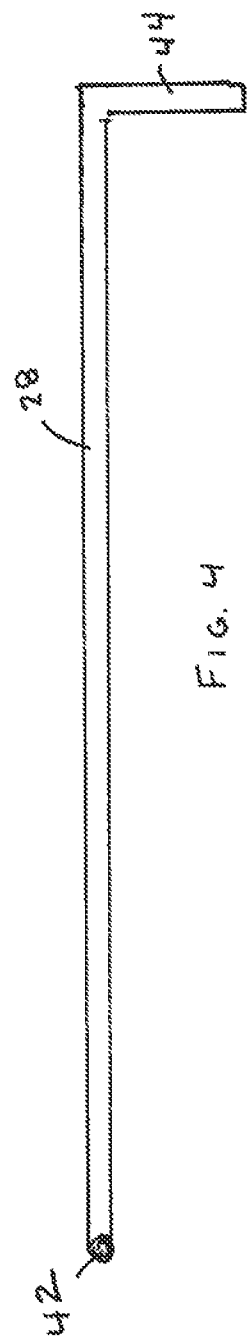
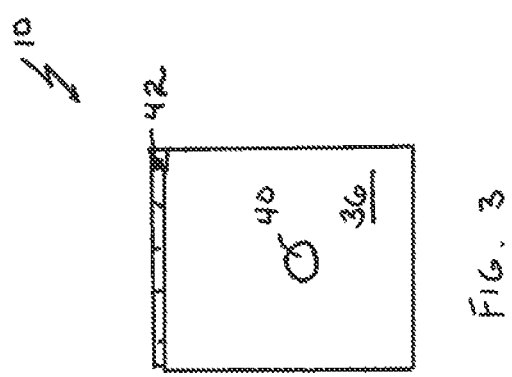

UNDERGROUND PIPE REPAIR AND PROTECTION SYSTEM

CLAIM OF PRIORITY

This application claims the benefit of U.S. Provisional Patent Application No. 63/231,486 filed Aug. 10, 2021, which is claimed herein by reference herein in its entirety.

FIELD OF THE INVENTION

The present invention relates to methods and devices to protect plumbing repairs including products and processes directing to minimize the likelihood of needing to repeat a repair, and if such an occurrence occurs, providing better access to the repair.

BACKGROUND OF THE INVENTION

Roots are known to be a major potential problem for sewer lines at a house. Water leaks at joints, or other breaks or cracks in the piping attracting the roots. Some plumbing companies have trademarks attractively directed to "rooting" or cleaning out sewer lines. The sewer line is accessed, a flexible auger/drill (aka "snake") is run through the sewer line, and normally a wad of roots and other material is cut free so that the material can be either pulled out of the piping or flushed into a sewer system.

While sewer piping systems are known to have often have root invasion issues, roots can also invade fresh water piping provided from a utility or other water sources to a home. This would normally occur at a location of a small leak, such as a drip. The roots often invade at the source of the leak Finding these types of blockages is more difficult than sewer lines, since they are normally a much smaller diameter (it would be unusual to run a snake through a fresh water line).

Both sewer and water line blockages normally require a plumber to repair, which is an expense for most property owners. What can be more frustrating, whether a blockage is on the fresh water or sewer line side, it is not usual for the roots to regrow and re-invade at the leak, as they are attracted to the water coming from the water source. This would necessitate the need to repeat the repair/removal of the roots.

A need exists to minimize the likelihood of having a repeat occurrence at the same location of a repair of a water line (either sewer or fresh water).

A need also exists to make access to a former repair easier to quickly see whether the location of the problem is the same as it has been in the past.

SUMMARY OF THE INVENTION

It is an object of many embodiments of the present invention to provide an improved method and apparatus to encapsulate repairs on water lines servicing a property.

It is an object of many embodiments of the present invention to reduce the likelihood of needing to repair root invasion into a repaired water line servicing a property.

Accordingly, in accordance with a present embodiment of the present invention, a capsule is applied about a repair, such as by a plumber to encapsulate the repair within the capsule or box. A box could be about 4 feet long (or other length) and run parallel to the water line in many instances. A width could be six inches or other appropriate width to accommodate the water line. These dimensions have been found to provide a stable base for stability.

An opening can be selectively provided at side or top that may have a hinged door connection, possibly to another side or first end. The end meeting at the hinge may have a first bore through which a first pipe segment with the break could be inserted before finishing the repair work. A first O-ring or other mechanism may provide a water tight seal at the first end. The opposing end, or second end, of the box may have a cutout, such as a v-shaped cutout terminating in a second bore at a bottom which receives a second pipe section opposite the repair. The door may have a downwardly directed extension which cooperates with the cutout to provide a water tight connection along the cutout except for the second bore which may have a second o-ring about abut the second pipe section at the second end to provide a water tight connection with the downward extension and the second bore at the second end.

Other structural box constructions could be employed as well to provide a hinged lid on a box-like or other structure through which two piping segments may extend to a repair joining the sections together. Once the repair is complete, the hinged lid may be shut and dirt, may cover the enclosure. Even if the repair were to continue to leak, the enclosure would provide a volume about the repair to hopefully contain the leakage in a water tight manner to prevent roots from growing into the break or provide a volume to receive roots which would then have an infinite number of directions to grow to receive the water in the volume without growing into the pipe. Finally, if blockage were to reoccur, one may only need to open the capsule and pull out the roots, possibly manually a that location. Of course, removing and replacing the repair could be desired for some situations, but a continued likelihood of needing to repeat the repair is greatly reduced and simplified through the use of the enclosure.

Locking pins may be useful to keep the hinged door shut. The capsule may be made of recycled material such as plastics or other materials.

BRIEF DESCRIPTION OF THE DRAWINGS

The particular features and advantages of the invention as well as other objects will become apparent from the following description taken in connection with the accompanying drawings in which:

FIG. 1 is a side plan view of an enclosure installed in accordance with a presently preferred embodiment of the present invention.

FIG. 2 is cross sectional view of the enclosure of FIG. 1 taken along the line A-A.

FIG. 3 is a front plan view of the enclosure of FIGS. 1-2;

FIG. 4 is a side plan view of the lid of the enclosure shown in FIGS. 1 and 3; and FIG. 5 is a rear plan view of the enclosure of FIGS. 1-3 and the lid of FIG. 4.

DETAILED DESCRIPTION OF THE PREFERRED EMBODIMENT

The figures show an enclosure 10 relative to first and second pipe segments 12,14 along with a repair 16 connecting the first and second pipe segments 12,14 together. Repair 16 may be a sleeve, joint, coupling, fitting, valve, weld, tape or other repair type of various kinds known in the marketplace. Some pipe segments 12,14 may contain pressurized water, others may be un-pressurized systems such as sewer piping, etc. First and second pipe segments may be polyvinyl chloride, galvanized pipe, pex (cross-linked polyethene), copper pipe or other piping on the freshwater side, and at least some of these on the waste water (sewer) side, possibly also including clay piping segments, cement piping segments, and others.

Repair 16 may cover over a section of broken pipe or gap 18 which may otherwise be a joint of adjacent pipe sections 12,14 or take other forms internal to the repair 16. Ideally, the repair 14 provides a water tight, or at least substantially water tight connection of the first pipe segment 12 to the second pipe segment 14.

Enclosure 10 may take many forms and shapes such as box like shapes, capsules, etc. Enclosure 10 preferably provides a encapsulating volume 20 which can be at least substantially water tight, if not water tight about the first and second pipe segments 12,14 to contain the repair 16 therein. The volume 20 preferably provides spacing about the repair 16 so that it is not in contact with the enclosure 10.

Enclosure 10 may have a height 22 such as five inches or other dimension to accommodate a three quarter inch water supply line (for pipe segments 12,14), for many embodiments, or could possibly be taller for sewer lines. A width 24 of six inches or other dimension has been found satisfactory as well. This provides sufficient volume 20 to be able to work on the repair 16, if necessary.

Height 22 may extend from a bottom 26 to a top or lid 28 which may form a top. Width 24 may extend from first and second sides 30,32. Length 34 may extend from first end 36 to second end 38. Length 34 may be four feet or other appropriate length. If rectangular for sides 30,32, bottom 26, lid 28 and first end 36, first end 36 may be parallel to second end 38. First and second ends 36,38 may also be perpendicular to first and second pipe segments 12,14 as well as lid 28 when closed.

The first pipe segment 12 is preferably directed through the first bore 40. A first o-ring or other structure, if not already disposed about the first pipe segment 12 may then located appropriately relative to the first bore 40 and the first pipe segment 12 to provide a water tight seal, or at least a substantially water tight first seal 40.

The lid 28 may be opened relative to the enclosure 10 to access the volume 20, if not already open. Lid 28 may be connected to the first end 12 such as along a hinge 42 which may both connect the lid 28 to the first end 12 as well permit rotation of the lid 28 upwardly about the hinge 42 to access the volume 20.

The lid 28 may have an extension 44 which may cooperate with a cutout 46 having edges 48,50 so that a first bore portion 52 of the extension 44 may form a second bore with second bore portion 54 of the cutout which receives the second pipe portion 14 therethrough. A second o-ring or other structure, may be used to provide a water tight or at least substantially water tight second seal 56 intermediate the second bore and the second pipe portion 14. Other structure for forming a second bore may be provided with other embodiments.

Extension 44 may have edges 58,60 which cooperate with edges 48,50 of the cutout 46 to provide water tight or substantially water tight joints when the lid 28 is closed relative to the second end 38 while forming the second bore. Edges 58,60 preferably taper from being wider at the lid 28 to narrower toward the first bore portion 52 to provide a v shaped extension. The lid 28 may be secured in a locked configuration such as by inserting pins 62,64 through slots 66,68 in the extension 44 which preferably cooperate with slots 70,72 in the second end 14 to secure the extension 44 to the second end 38.

Once the repair 16 is made and the lid 28 shut and the second seal 56 established, it is often common to cover the area with dirt (as it often must be dug up since root invasion is often a common source of needing to provide the repair 16 in the first place). Roots may then find that the enclosure 10 provides a water tight, or at least substantially water tight capsule about the repair so that the roots are not attracted to the area of the repair 16. In some instances, leakage may occur from the enclosure 10 at which one would expect roots to encroach into the enclosure 10. Even in these situations, the roots then may lack the necessary dirt for support internal to the volume 20 to access the site of the repair 16 for an extended period of time. Furthermore, the roots may grow past the area of the repair and be unable to reorient to access the repair 16 internal to the volume 20. Finally, even if the roots do find the repair 16 and access it to cause another blockage, access to the repair is simplified. One need only to dig up to access the site of the enclosure 10, open the lid 28 and then pull out or cut the roots, and possibly adjust or replace the repair 16.

Recycled materials, such as plastics, metals, etc. may be employed to form at least various portions of the enclosure 10.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of encapsulating a plumbing repair comprising the steps of:
   (a) providing an enclosure having a volume, a first end, a second end opposite the first end, and a lid selectively providing access to the volume, the lid being pivotably connected to the first end at a hinge and the lid having an extension, and the second end having a cutout, said extension contacting a portion of the cutout when closed;
   (b) directing a first pipe segment through a first bore at the first end of the enclosure;
   (b) completing a repair of the first pipe segment to a second pipe segment;
   (c) locating the repair within the volume of the enclosure with the second pipe segment directed out of the second end of the enclosure;
   (d) sealing the first pipe segment relative to the first end;
   (e) sealing the second pipe segment relative to the second end; and
   (f) shutting the lid.

2. The method of claim 1 wherein in the step of providing the enclosure, the first end is parallel to second end.

3. The method of claim 2 wherein in the step of providing the enclosure, the lid forms a top of the enclosure perpendicular to the first and second ends when closed.

4. The method of claim 1 wherein in the step of providing the enclosure, the lid forms a top of the enclosure perpendicular to at least one of the first and second ends when closed.

5. The method of claim 1 wherein in the step of providing the enclosure, the extension and cutout cooperate to form a second bore through which the second pipe section extends through in the step of directing the second pipe section through the second end.

6. The method of claim 5 wherein in the step of providing the enclosure, the extension tapers along edges from a width of the second end to a narrower portion at the second bore.

7. The method of claim 6 wherein in the step of providing the enclosure, the extension and cutout each have edges which lock together in a locked configuration.

8. The method of claim 7 further comprising the step of locking the extension to the cutout with pins.

9. The method of claim 1 further comprising the step of sealing the first pipe section to the first end at the first bore with a first seal.

10. The method of claim 9 further comprising the step of sealing the second pipe section to the second end at the second bore with a second seal.

11. The method of claim 1 wherein in the step of providing the enclosure, at least a portion of the enclosure is formed of recycled materials.

12. The method of claim 1 wherein in the step of locating the repair in the volume, the volume creates an air space about the repair in the volume.

13. An enclosed pipe repair comprising:

an enclosure having a volume, a first end, a second end opposite the first end, and a lid selectively providing access to the volume, the lid being pivotably connected to the first end at a hinge and the lid having an extension, and the second end having a cutout, said extension contacting a portion of the cutout when closed;

a first pipe segment directed through a first bore at the first end of the enclosure;

a repair connecting the first pipe segment to a second pipe segment wherein the repair is located within the volume of the enclosure with the second pipe segment directed out of the second end of the enclosure;

the first pipe segment is sealed relative to the first end;

the second pipe segment is sealed relative to the second end; and the lid securing access to the repair in the volume.

\* \* \* \* \*